(12) United States Patent
Baudoin

(10) Patent No.: US 8,701,797 B2
(45) Date of Patent: Apr. 22, 2014

(54) BEARING ASSEMBLY FOR DOWNHOLE MOTOR

(76) Inventor: Toby Scott Baudoin, Rayne, LA (US)

( * ) Notice: Subject to any disclaimer, the term of this patent is extended or adjusted under 35 U.S.C. 154(b) by 272 days.

(21) Appl. No.: 13/023,693

(22) Filed: Feb. 9, 2011

(65) Prior Publication Data

US 2011/0192648 A1 Aug. 11, 2011

Related U.S. Application Data

(60) Provisional application No. 61/337,656, filed on Feb. 11, 2010.

(51) Int. Cl.
*E21B 4/00* (2006.01)

(52) U.S. Cl.
USPC .......................... 175/107; 166/66.4; 166/104

(58) Field of Classification Search
USPC ..................... 166/66.4, 104, 333.1; 175/107
See application file for complete search history.

(56) References Cited

U.S. PATENT DOCUMENTS

| | | | |
|---|---|---|---|
| 3,722,608 A * | 3/1973 | Faulk | 175/65 |
| 5,337,840 A | 8/1994 | Chancey et al. | |
| 5,350,242 A * | 9/1994 | Wenzel | 384/97 |
| 5,738,358 A | 4/1998 | Kalsie et al. | |
| 5,956,995 A | 9/1999 | Herben et al. | |
| 6,561,290 B2 | 5/2003 | Blair et al. | |
| 6,827,160 B2 * | 12/2004 | Blair et al. | 175/107 |
| 6,905,319 B2 | 6/2005 | Guo | |
| 6,949,025 B1 | 9/2005 | Kraus et al. | |
| 7,186,182 B2 | 3/2007 | Wenzel | |
| 7,500,787 B2 * | 3/2009 | Cioceanu | 384/97 |
| 7,549,487 B2 * | 6/2009 | LeBlanc et al. | 175/93 |
| 8,215,841 B2 * | 7/2012 | Wenzel | 384/97 |
| 2003/0015352 A1 * | 1/2003 | Robin | 175/107 |
| 2008/0029304 A1 * | 2/2008 | LeBlanc et al. | 175/57 |
| 2011/0147091 A1 | 6/2011 | Bullin | |
| 2012/0325561 A1 * | 12/2012 | LeBlanc et al. | 175/107 |

* cited by examiner

*Primary Examiner* — Cathleen Hutchins
(74) *Attorney, Agent, or Firm* — Law Office of Jesse D. Lambert, LLC

(57) ABSTRACT

A downhole motor for drilling and servicing of wells has an elongated outer housing and an elongated mandrel rotatably disposed within the housing. A primary thrust bearing is disposed between the lower end of the housing and the mandrel, and transfers axial loads downward from the housing to the mandrel, and then to the drill bit or other tool mounted on the lowermost end of the mandrel. The placement of the primary thrust bearing permits it to extend radially to the outer diameter of the housing. One preferred embodiment of the primary thrust bearing comprises bearing surfaces of polycrystalline diamond compact ("PDC") material.

7 Claims, 6 Drawing Sheets

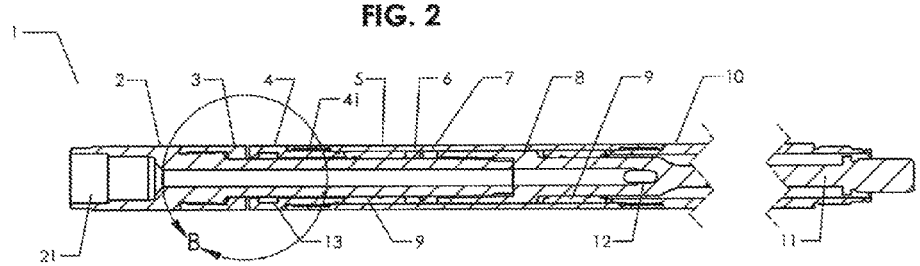
FIG. 2
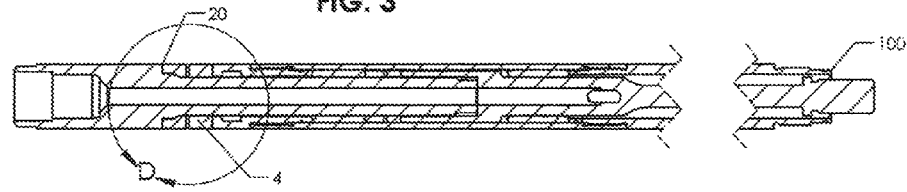
FIG. 3
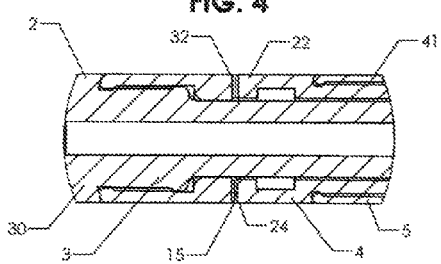
FIG. 4
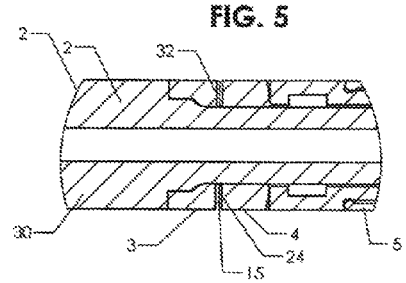
FIG. 5
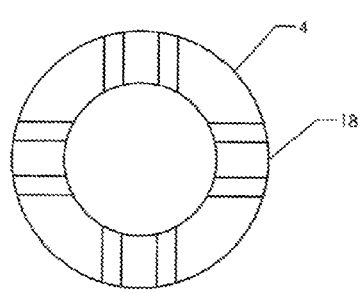
FIG. 6
FIG. 7

BEARING ASSEMBLY FOR DOWNHOLE MOTOR

CROSS REFERENCE TO RELATED APPLICATIONS

This regular United States patent application claims priority to U.S. provisional patent application Ser. No. 61/337,656, filed Feb. 11, 2010, for all purposes.

BACKGROUND

Traditionally, earthen boreholes for oil and gas production, fluid injection, etc., frequently referred to as "wells," were drilled by rotating a drillstring from the drilling rig, by means of a rotary table and kelly. The drill bit on the lowermost end of the drillstring was in turn rotated, and with the addition of weight applied to the drill bit by drill collars and other components of the drillstring, drilling took place.

An alternative way of rotating the drill bit is by means of a downhole device, either a downhole motor such as a positive displacement motor (frequently called a Moineau motor), or a downhole turbine. For purposes of this patent application, the term "downhole motor" will be used to broadly encompass any means of generating drill bit rotation, which is positioned downhole in the drillstring. Generally, when a downhole motor is being used, the drillstring is not rotated, or rotated slowly to reduce drag on the drillstring. Downhole motors utilize drilling fluid ("mud," or in some cases gas) circulation, down through the drill string and through the downhole motor, to generate rotation (as described further below).

Downhole motors are also used in settings other than conventional drilling, for example with coiled tubing, or workstrings used in well cleanout work and the like.

Downhole motors, while taking various forms, generally comprise an outer housing which is fixed (generally by a threaded connection) to the drillstring, and a rotatable mandrel positioned within the housing and extending from the lowermost end of the housing. It is the mandrel that is rotated by means of fluid circulation through the drillstring and through the downhole motor. The drill bit is connected to the lowermost end of the mandrel, which usually has a "bit box" connection thereon. The mandrel therefore is free to rotate with respect to the housing, yet is fixed longitudinally within the housing.

Forces between the housing and the mandrel are both radial (side-to-side) and axial or thrust loads (acting along the longitudinal axis of the downhole motor). Radial bearings are positioned within the housing, between the housing and the mandrel, to take up the radial loads.

Thrust loads may be further separated into (1) loads or forces tending to push the mandrel out of the housing; and (2) loads or forces tending to push the mandrel up into the housing, or said another way, which are transferred from the housing to the mandrel to force it downward, such as to impose weight on the bit during drilling. With regard to the first category of thrust load, thrust bearings are positioned within the housing to sustain loads tending to force the mandrel axially out the lower end of the housing; such loads are generated by fluid circulation with the bit off bottom (such fluid pressure tending to push the mandrel out of the housing), or by pulling on the drill string with the bit and/or mandrel stuck in the hole. These thrust bearings will be referred to as secondary thrust bearings.

With respect to the first category of thrust load, in order to transmit a load to the drill bit, drillstring weight is transferred first to the housing, and from the housing to the mandrel, and thence to the drill bit. This downward weight or force transfer between the housing and mandrel is done by one or more thrust bearings, which for purposes of this application will be called the primary thrust bearings. Known prior art primary thrust bearings in downhole motors have taken various forms, including ball bearing assemblies, etc., all share one common structural attribute, namely that the primary thrust bearing assembly is contained within the bore of the housing, and positioned between the inner diameter of the housing and the mandrel. This limits the size of the primary thrust bearings which may be used, which in turn results in higher unit force (pressure) loads on the thrust bearings. Higher unit force loads result in increased wear and failure of the primary thrust bearings.

Yet other disadvantages exist with prior art designs. In such designs, a space or gap exists between the lowermost end of the housing and any upwardly facing surface (i.e. a shoulder) of the mandrel. This space creates an area of the mandrel which is exposed to the wellbore and fluids therein. Cuttings from drilling operations can damage or sever the mandrel at this unprotected location. Also, in through tubing or coiled tubing operations, this space creates a ledge or shoulder which can cause a motor to become lodged or stuck in the wellbore. Yet another disadvantage is increased length of the tool, due to placement of the thrust bearings within the body of the housing.

SUMMARY

The present invention comprises a downhole motor which positions the primary thrust bearings between the lowermost end of the housing, and the mandrel. This position permits the primary thrust bearing area to extend to the full extent of the outer diameter of the housing, which results in an increased bearing surface area. This larger bearing surface area results in greatly reduced unit thrust loads, which in turn results in longer bearing and downhole motor life. Preferably, a very hard material, such as poly crystalline diamond compact (commonly known as "PDC") elements are used as the bearing surfaces, although other bearing materials and ball bearing assemblies could be used. Other attributes of the present invention will be set out in the following description.

BRIEF DESCRIPTION OF THE DRAWINGS

FIG. 2 is a section view of one embodiment of the downhole motor of the present invention, particularly the bearing assemblies thereof.

FIG. 3 is a section view of another embodiment of the downhole motor of the present invention, particularly the bearing assemblies thereof.

FIG. 4 is a sectioned detail view of the area circled as "B" in FIG. 2.

FIG. 5 is a sectioned detail view of the area circled as "D" in FIG. 3.

FIG. 6 is an end view of element 4 (a bearing element) as seen in FIG. 5.

FIG. 7 is a side view of the bearing element shown in FIG. 6.

DETAILED DESCRIPTION

Figure 1:
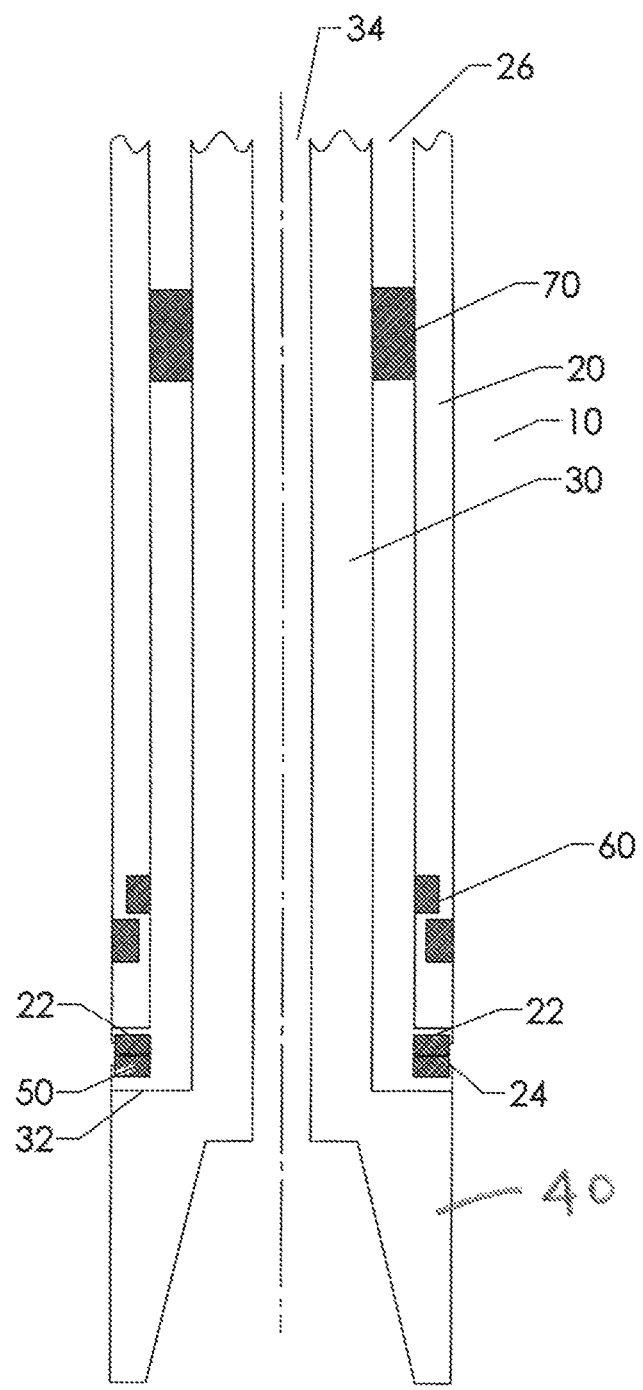
FIG. 1 is a simplified cross section view of a downhole motor embodying the principles of the present invention.

The present invention comprises a downhole motor for use in drilling, workover, coiled tubing, snubbing, hydraulic workover, fishing and like operations, having an improved bearing assembly, in particular the primary thrust bearing assembly. In one embodiment, this downhole motor bearing assembly utilizes poly crystalline diamond compact or PDC materials in the fabrication of bearings, particularly the primary thrust bearings. PDC materials, typically in the form of inserts, are used in lieu of or in conjunction with more traditional types of bearings, primarily ball bearings and races. PDC materials may also be utilized in the fabrication of the radial bearings. These thrust bearings may also utilize carbide materials alone or in conjunction with PDC materials. Other suitable bearing materials include ceramics, diamond, diamond coatings or other hard materials (generally exceeding Rc 60).

It is to be understood that orientational terms used herein are intended to reflect the usual orientation of the downhole motor in a wellbore. As such, "downward" means generally in a direction toward the bottom of a borehole; "upward" is the opposite direction. "Axial" loads are loads generally along the longitudinal axis of the downhole motor (which is generally coincident with that of the drillstring and the borehole).

One of several novel aspects of the present downhole motor is that the primary thrust bearings which support weight on bit loads (loads and or forces in a downward, axial direction in relation to a vertical wellbore) are disposed between the lower surface of the housing, and an upwardly facing surface of the mandrel. Typically, the mandrel terminates (at its lower end) in a threaded female receptacle (called a "box") or a male threaded portion (called a "pin"). Placement of the primary thrust bearing between the lower surface of the housing and an upwardly facing surface of the mandrel provides several advantages over known prior art designs. First, these primary thrust bearings fill the gap (in prior art designs) between the lower surface of the housing and the upwardly facing surface of the mandrel. A second advantage is the reduction in length. This is due to the weight on bit supporting thrust bearings to be located in an area of the motor which would normally be open, unoccupied space rather than inside of a housing. A third advantage is that the outside diameter of the primary thrust bearings are enabled to be the same as the outside diameter (OD) of the housing. This increases the overall size of the bearing and thus bearing contact surface, with the result of dramatically increasing the longevity of the bearing because the loads are shared over a larger surface area (lowering the load per unit area—typically measure in pounds per square inch (psi)). It is understood that either or both of the housing and mandrel may be fabricated in a single, unitary piece, or made up of multiple elements joined together by threaded connections or other means known in the art.

Another point of novelty of the present design is the provision of interlocking face grooves or face features to connect abutting components, thereby preventing relative rotation therebetween. Certain components within a bearing assembly must be constrained from rotation with respect to the structure on which the component is attached. In the case of PDC, carbide, or ceramic insert bearings, the stationary bearing or race is known as the stator and is generally connected to the housing, so as to be rotationally fixed with respect to the housing. The rotating bearing or race is known as the rotor and is rotationally fixed to, and therefore rotates with, the mandrel. With radial bearings, the outer radial bearing component is usually connected to the housing such that relative rotation takes place between the outer diameter of a rotating mandrel (disposed within the bore of the housing) and inner diameter of the radial bearing. In some radial bearing designs, the radial bearing itself comprises two components, a rotor and stator. Again, the inner radial bearing is rotationally fixed with respect to the mandrel and the outer radial bearing is rotationally fixed with respect to the housing.

The various bearing assemblies of the present invention may be sealed, thereby retaining lubricants inside of the bearing assembly and excluding wellbore fluids from entering the bearing assembly. Seals may take various forms, including O-rings, "Poly-Pak" seals by Parker or other manufacturers, "Kalsi" seals from Kalsi or other manufacturers, machined seals, molded seals, etc. and may be used in conjunction with an anti-extrusion rings, generally made of copper. The sealing system may also include a pressure balancing component which balances the pressure within the lubricant with that of the wellbore.

One preferred embodiment of the downhole motor of the present invention comprises a multi-piece, preferably two piece, mandrel. The lower mandrel section comprises a shaft and a bit box (for connection to a drillbit or the like), with either female (box) threads, or male (pin) threads. The upper end of the bit box contains some means to constrain a rotor thrust bearing, such as a thread, face groove, etc. The upper and lower mandrel sections are preferably threadably connected. The upper mandrel comprises a shaft and some means for transmitting torque, such as a flexshaft, constant velocity shaft, clutch type shaft, or other shafts commonly known as "transmissions." The lower face of the upper mandrel may also contain a face groove to rotationally lock an inner rotor thrust bearing.

The lower mandrel may also have a downwardly facing shoulder disposed within the mandrel. This shoulder comprises a redundant means of insuring that the lower mandrel is retained to or within the bearing assembly. This becomes important especially in the event that the drillbit becomes stuck and the operator must begin pulling and or jarring on the motor in an attempt to free it. In this case, it is important that the mandrel does not become dislodged from the bearing assembly, thereby creating a fishing operation. In the bearing assembly design utilizing this shoulder, the lower stator bearing race and or housing must be split axially in two halves to accommodate assembly of the bearing assembly. These two halves would contain a male threaded portion. To assemble, these two halves would be abutted together with their upper and lower faces flush, then threaded into a female threaded receptacle, whereby the two male halves would thread simultaneously. Upon shouldering up, the threaded connection would be tightened to the proper torque.

Turning to the drawings, some of the presently preferred embodiments of the present invention can now be described.

FIG. 1 is a simplified cross section view of a downhole motor embodying the principles of the present invention.

Downhole motor 10 comprises a housing 20 having a lower end 22 with a downwardly facing surface 24. As readily understood from the drawing, housing 20 has a longitudinal bore 26 therethrough. Mandrel 30 is disposed within housing 20, and is rotatable therein, driven by a means for generating rotation (whether positive displacement means, turbine, etc.). Mandrel 30 extends beyond the lower end of housing 20, and has an upwardly facing surface 32, and a longitudinal bore 34, through which drilling fluids are pumped. Typically, mandrel 30 has at its lowermost end a so-called bit box 40, with a threaded connection (typically female) for receiving a drill bit or similar tool.

A primary thrust bearing 50 is disposed between lower end of housing 20 and mandrel 30, for example between the downwardly facing surface 22 at the lower end of housing 20, and the upwardly facing surface 32 of mandrel 30. It can be readily understood that downward axial forces are transferred from housing 20, through primary thrust bearing 50, to mandrel 30, and then to the drill bit or other tool. Primary thrust bearing 50 preferably is dimensioned to extend radially to or nearly to the outer diameter of housing 20, so as to maximize surface area available for the bearing surface. It is understood that either or both of housing 20 and mandrel 30 may comprise multiple parts.

Primary thrust bearing 50 may take various forms. One form is simply hardened steel for the opposing surfaces or faces of the housing and the mandrel. Preferably, however, some form of hardened material is used for the bearing. One presently preferred bearing material comprises poly crystalline diamond compact material, which may take the form of a plurality of inserts (of circular or other shape), set into the opposing face surfaces. The bearing inserts could also be set into removable rings or sleeves, which engage locking surfaces in the opposing face surfaces (more fully described hereafter), which rings or sleeves can be readily changed out for replacement or repair. Other hard material such as carbide or ceramics could be used for the bearing surfaces. If desired, the bearing can be sealed so as to prevent drill solids or drilling fluid from entry into the bearing.

Other types of bearing assemblies may be used, including ball bearings, preferably sealed to protect from solids and drilling fluids.

It can be readily seen from FIG. 1 that the present invention permits use of a relatively large primary thrust bearing, with a maximum diameter at or near the outer diameter of the housing, to yield lower unit loads and longer bearing life.

Figure 1A:
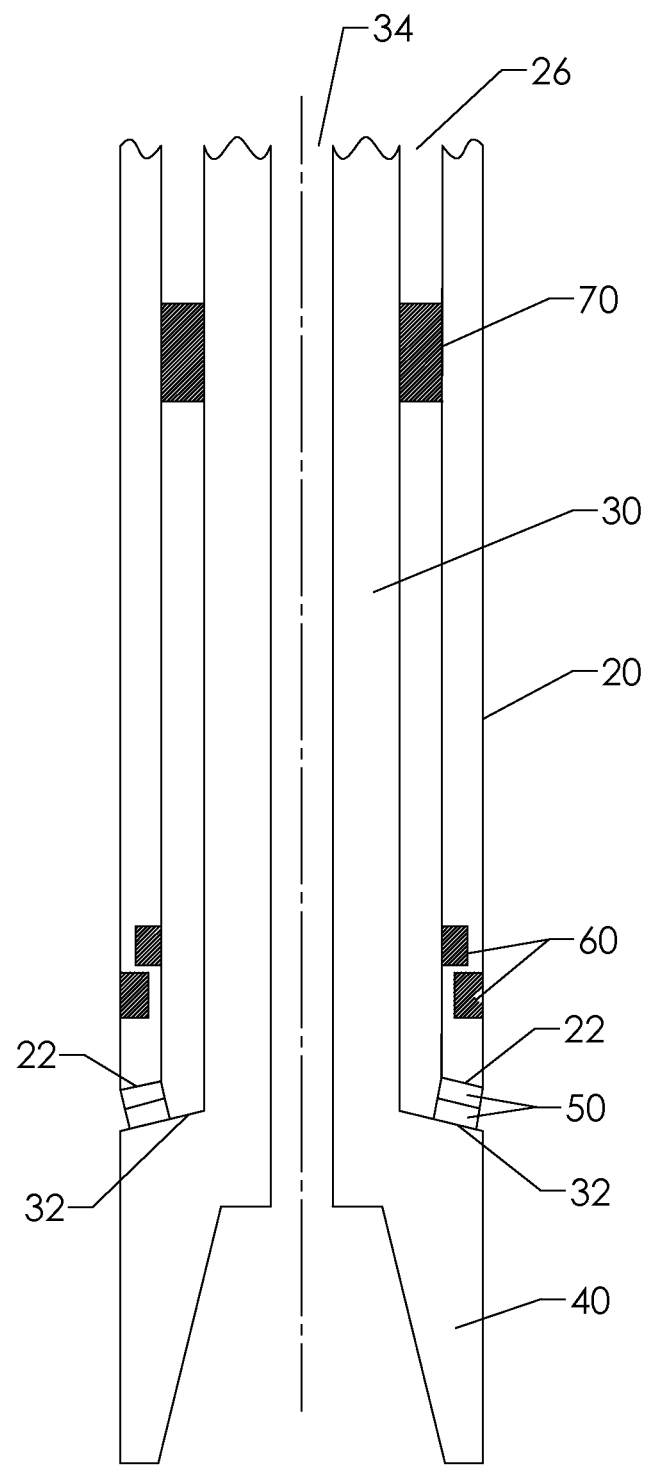
FIGS. 1A and 1B are views of alternative arrangements of the primary thrust bearing.
Figure 1B:
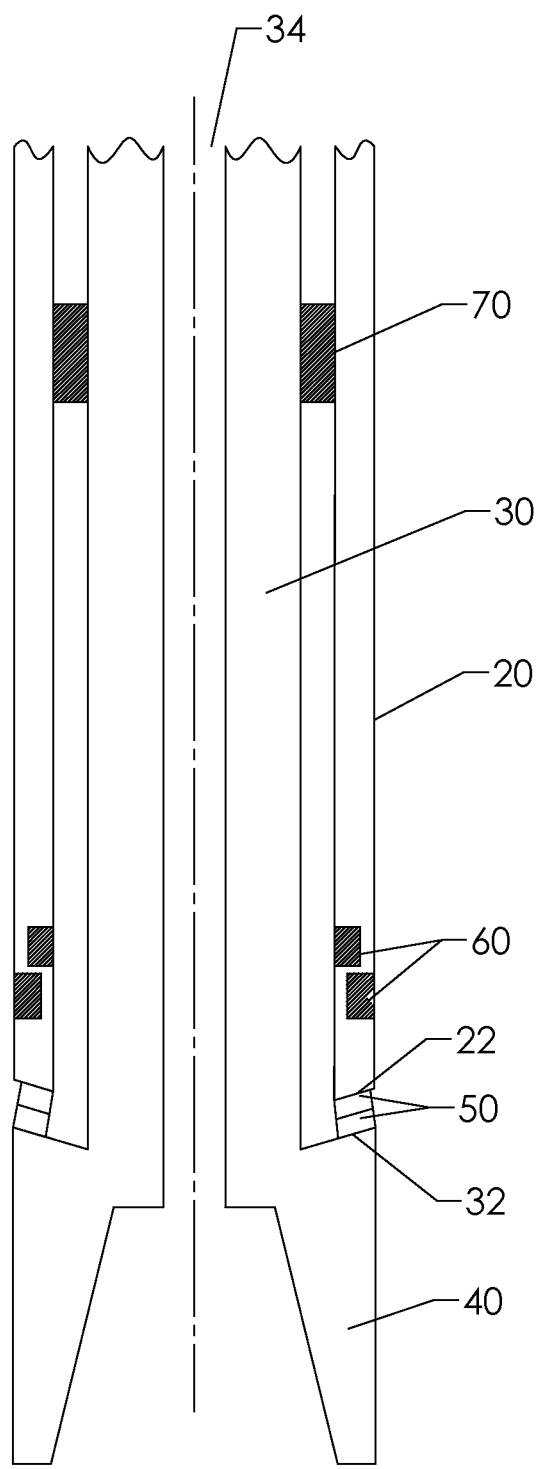

FIGS. 1A and 1B show alternative orientations of the downwardly facing surface on housing 20 and the upwardly facing surface on mandrel 30. In FIG. 1, the faces are substantially at right angles to the longitudinal axis of downhole motor 10; in FIGS. 1A and 1B, the faces are oriented at other than a right angle to the longitudinal axis of downhole motor 10, namely at an obtuse or acute angle with respect to such longitudinal axis (depending upon the reference direction). It is understood that with such angular orientation, the force transfer through primary thrust bearing 50 has both an axial (parallel to the longitudinal axis of downhole motor 10) and radial component.

The downhole motor further comprises one or more secondary thrust bearings 60. While primary thrust bearing 50 transfers most or all downward forces from housing 20 to mandrel 30, secondary thrust bearing 60 transfers forces between housing 20 and mandrel 30 in the opposite direction. Such forces arise when fluids are pumped through downhole motor 10 with little or no weight on bit, and tend to push mandrel 30 out of the lower end of housing 20. In addition, in the event that the bit and/or mandrel 30 become stuck in the well, pulling on the drillstring will tend to pull mandrel 30 out of housing 20. Secondary thrust bearing 60 may comprise bearing elements of PDC material, carbide, ceramics, balls and bearings, etc.

Side loading between mandrel 30 and housing 20 is primarily transferred by one or more radial bearings 70 between mandrel 30 and housing 20. Radial bearings 70 may comprise ball bearings or bearing elements of PDC, carbide, ceramic or other hard materials, bronze or self lubricating materials.

Further Embodiments of the Downhole Motor

FIGS. 2 and 3 illustrate downhole motors embodying other principles of the invention, differing mainly in the structure of the primary thrust bearing arrangements.

Figure 10:
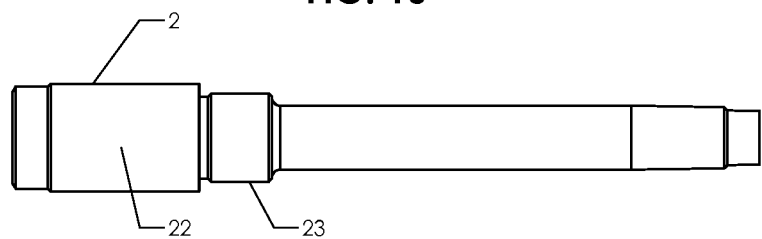
FIG. 10 is a view of one embodiment of a lower mandrel section, illustrating a threaded connection for attachment of a bearing sleeve.

Turning to FIGS. 2 and 4 (FIG. 4 being a more detailed view of the section noted as "B"), a downhole motor is shown which comprises multi-piece mandrel and housing. Mandrel 30 comprises a lower mandrel section 2 having a threaded connection (as previously described) on its lower most end for attachment to a drill bit or the like. Lower mandrel section 2 terminates in a "bit box" 21. Sleeve member 3 is threadably attached to lower mandrel section 2, and provides an upwardly facing surface 32 on which bearing surface 15 is present. Lower housing section 5 has a lower end piece 4 attached thereto, for example by threads 41. Lower end piece 4 has a lower end 22 having a downwardly facing surface 24, in opposition to the upwardly facing surface of sleeve member 3. Bearing surface 15 is positioned on the downwardly facing surface. As is readily understood, axial loads are thereby transmitted between housing 20 and mandrel 30. The embodiment of FIGS. 2 and 4 preferably comprise threaded connections between mandrel 30 and sleeve member 3, and lower housing section 5 and lower end piece 4; however, it is understood that other means of connecting same are possible. FIG. 10 shows a lower mandrel section 2 with threaded section 23, which engages sleeve member 3.

Yet another embodiment comprises engaging surfaces, namely a face groove or spline, to connect sleeve member 3 to mandrel 30, and lower end piece 4 to lower housing section 5. With reference to FIGS. 3, 5, 6, 7, and 11, this embodiment can be described. Sleeve member 3 comprises one or more, preferably two or more, engaging surfaces 18, which mate with like surfaces or notches in lower mandrel section 2. Such surfaces prevent relative rotation between sleeve member 3 and lower mandrel section 2. FIGS. 6 and 7 show side and end views of sleeve member 3. Bearing surfaces 19 are affixed to sleeve member. Lower end piece 4 and lower housing section 5 have similar engaging surfaces to rotationally lock lower end piece and lower housing section. The lower most housing may have provisions for a guide ring 13.

Figure 8:
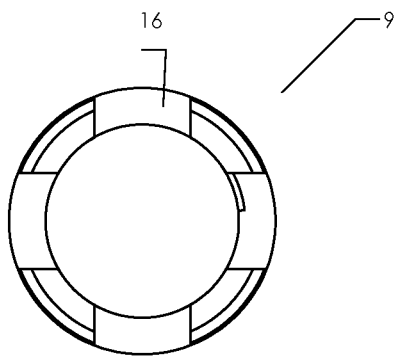
FIG. 8 is an end view of one embodiment of a radial bearing (seen as element 9 in FIG. 2).
Figure 9:
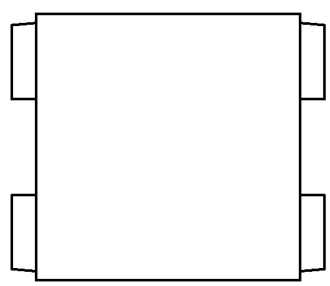
FIG. 9 is a side view of the radial bearing of FIG. 8.

Radial bearings 9 provide radial support for the mandrel sections 2 and 8. These radial bearings 9 may also have face grooves or splines to prevent relative rotation with mating components. They may also utilize press fits, shrink fits, or heat fits to keep them stationary. FIGS. 8 and 9 show additional detail of one embodiment of radial bearings. Radial bearing 9 may be provided with engaging surfaces 16 to rotationally lock same.

Figure 13:
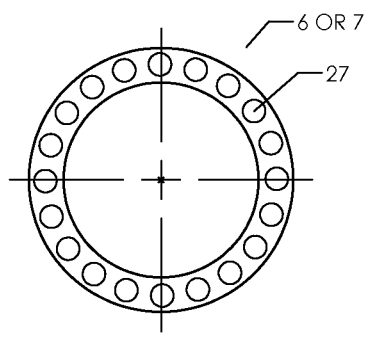
FIG. 13 is an end view of one embodiment of a PDC or carbide inserted thrust bearing which can be either a rotor or stator thrust bearing.
Figure 14:
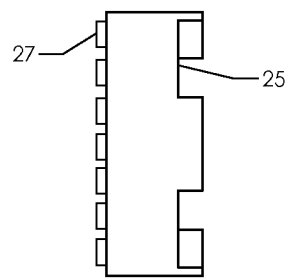
FIG. 14 is a side view of the thrust bearing of FIG. 13, with certain of the inserts not shown for clarity.

The downhole motor preferably comprises an additional set of thrust bearings for axial forces in an upward direction—that is, forces tending to push or pull mandrel 30 out of the lower end of housing 20. Such secondary thrust bearings were shown in FIG. 1 as element 60. In more detail, with reference to FIG. 2, stator thrust bearing 6 and rotor thrust bearing 7 provide support for loads created by pulling on the bearing assembly. Preferably, thrust bearings 6 and 7 comprise face grooves or splines, as shown in FIG. 14, to rotationally lock the thrust bearings to their respective components. Bearing elements 27, as seen in FIG. 13, are mounted on the thrust bearings to provide bearing surface.

Mandrel 30 can be in multiple parts. As seen in FIG. 2, in one embodiment lower mandrel section 2 is threadedly coupled to upper mandrel section 8. Upper mandrel section 8 may be provided with port holes 12 to divert all or some of the drilling fluids to the fluid passage which is centrally disposed within each mandrel. The upper mandrel may also be provided with a flex shaft 11 for connection to the rotor of a power section of a downhole motor. In some directional drilling applications, the need arises for a motor to have a bend, generally between 0 and 4 degrees. For this application, the upper mandrel 8 may consist of two components, a mandrel and a flexible coupling. Upper end 26 connects to the rotor of the power section of a downhole motor. The flexible couplings are known as "transmissions" in the industry. The upper end 100 of housing 20 is typically fitted with a male pin for coupling to the stator of a power section.

FIG. 4 is a detailed view of the area designated as "B" in FIG. 2, and shows one embodiment of the lower set of thrust bearings. This embodiment affixes the bearing material, which may PDC, carbide, or ceramic, to a housing to connect to the bit box and lower housings.

FIG. 5 is a detail view of the area designated as "D" in FIG. 3, and shows a second embodiment of the lower set of thrust bearings. This embodiment affixes the bearing material, PDC or carbide, to a ring or sleeve to connect to the bit box and lower housing. Each ring contains face grooves or features such that relative rotation between abutting components does not take place. Relative rotation only takes place at surface 15.

FIGS. 6 and 7 illustrate one possible embodiment for the face grooves or splines 18 or features which prevent relative rotation on the rotor and stator thrust bearing races. A similar interlocking feature may be used on the radial bearings as well. The actual profile and shape of these interlocking features can vary widely and thus the embodiment shown is only one possibility within the scope of this invention.

FIG. 8 is an end view of one embodiment of a radial bearing 9 containing face grooves or interlocking features.

FIG. 9 is a side view of the radial bearing of FIG. 8.

FIG. 10 is a side view of one embodiment of lower mandrel section 2 illustrating a threaded portion 23 on the upper end of the bit box 22, for attachment of sleeve member 3.

Figure 11:
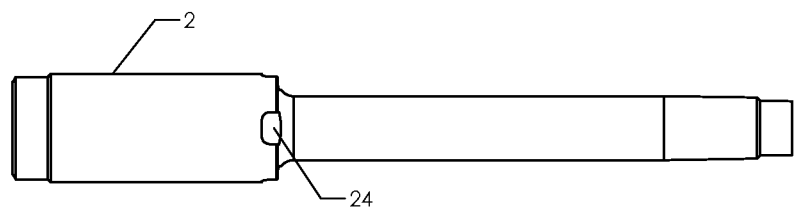
FIG. 11 is a view of one embodiment of a lower mandrel section, illustrating an engaging surface connection for attachment of a bearing sleeve.

FIG. 11 is a side view of a second embodiment of the lower mandrel section 2 illustrating face grooves 24 on the upper end of the bit box 22, for connection of sleeve member 3. These face grooves are one of many various types and or styles of interlocking face grooves within the scope of this invention.

Figure 12:
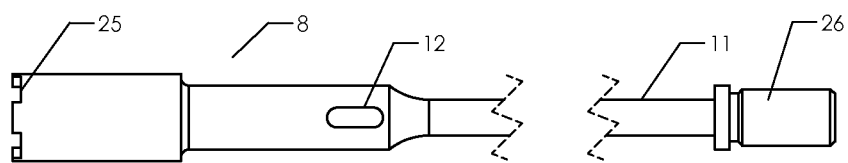
FIG. 12 is a view of the upper mandrel section.

FIG. 12 is a side view of upper mandrel section 8 showing the interlocking face grooves 25.

FIG. 13 is an end view of one embodiment of a PDC or carbide insert bearing, with the inserts designated as element 27. This bearing can be either a rotor 7 or stator 6 thrust bearing. These inserts are shown as cylindrical but can be oval, wafers, or can encompass the entire face of the bearing, or can be of any shape. The cylindrical inserts shown are merely as an example of one of many variations possible.

FIG. 14 is a side view of the bearing of FIG. 13, showing the face grooves 25 for interlocking abutting components.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example:

various materials may be used for the bearing materials, such as PDC, carbide, ceramic, hardened steels, in some applications brass or bronze, or even non-metallic materials materials for the various components of the downhole motor may be varied dimensions may be varied to suit different applications different components of the downhole motor may be made in multiple parts, for example the mandrel and the housing; references to such components are all-encompassing, whether of one part or multiple parts.

Therefore, the scope of the invention is to be determined not by the illustrative examples set forth above, but by the appended claims and their legal equivalents.

I claim:

1. A downhole motor, comprising:
    an elongated housing having a longitudinal bore therethrough and a lower end comprising a removable end section;
    an elongated mandrel rotatably disposed within said bore of said housing and extending beyond said lower end of said housing, and comprising a removable sleeve; and
    a primary thrust bearing disposed outside of said housing and between said lower end of said removable end section and said sleeve, whereby downward axial loads can be transferred from said housing to said mandrel, and wherein said primary thrust bearing extends radially to substantially the outer diameter of said housing;
    one or more radial bearings disposed within said housing, between said mandrel and said housing; and
    one or more secondary thrust bearings disposed within said housing, whereby upward axial loads can be transferred from said housing to said mandrel.

2. The downhole motor of claim 1, wherein said bearings comprise polycrystalline diamond compact inserts.

3. The downhole motor of claim 1, wherein said primary thrust bearing comprises ceramic inserts.

4. The downhole motor of claim 1, wherein said primary thrust bearing comprises carbide inserts.

5. The downhole motor of claim 1, wherein said primary thrust bearing comprises ball bearings.

6. The downhole motor of claim 1, wherein said secondary thrust bearing comprises ball bearings.

7. The downhole motor of claim 1, wherein said radial bearings comprise carbide material.

* * * * *